(12) United States Patent
Eifler et al.

(10) Patent No.: US 7,433,932 B2
(45) Date of Patent: Oct. 7, 2008

(54) SYSTEM AND METHOD OF ACCESSING DYNAMIC WEB CONTENT FROM A MULTIFUNCTION PRINTER USING STANDARD PROTOCOLS

(75) Inventors: Mark Allen Eifler, Frankfort, KY (US); Charles Edward Gregory, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 779 days.

(21) Appl. No.: 11/055,350

(22) Filed: Feb. 10, 2005

(65) Prior Publication Data

US 2006/0179413 A1    Aug. 10, 2006

(51) Int. Cl.
*G06F 15/16* (2006.01)
(52) U.S. Cl. .................. 709/217; 709/202; 709/203; 709/216; 709/246; 358/1.1; 358/1.13; 358/1.15; 358/1.18
(58) Field of Classification Search .................. 709/202, 709/203, 212, 216, 217, 246
See application file for complete search history.

(56) References Cited

U.S. PATENT DOCUMENTS 6,583,888 B1    6/2003 Salgado et al.

| | | |
|---|---|---|
| 2002/0133564 A1 | 9/2002 | Takayama |
| 2002/0196460 A1* | 12/2002 | Parry .................. 358/1.15 |
| 2003/0048470 A1 | 3/2003 | Garcia |
| 2003/0050965 A1 | 3/2003 | Green |
| 2003/0084049 A1 | 5/2003 | Wiley |
| 2003/0204591 A1 | 10/2003 | Ueda et al. |
| 2004/0021896 A1 | 2/2004 | Chen |
| 2004/0024811 A1 | 2/2004 | Kitada et al. |
| 2004/0036905 A1 | 2/2004 | Chang |
| 2004/0057064 A1 | 3/2004 | Stringham |
| 2004/0150852 A1 | 8/2004 | McIntyre et al. |
| 2004/0169878 A1 | 9/2004 | Toda et al. |
| 2004/0184108 A1 | 9/2004 | Takano |
| 2005/0105129 A1* | 5/2005 | Takahashi .................. 358/1.15 |

* cited by examiner

*Primary Examiner*—Michael Won
(74) *Attorney, Agent, or Firm*—Michael Best & Friedrich, LLP

(57) ABSTRACT

A system and method of accessing dynamic web content from a peripheral are presented. An embodiment of the method includes the acts of providing a graphical user interface (GUI) on the peripheral, the GUI including a plurality of elements selectable by a user; associating at least one element with a script configured to access dynamic web content when executed; detecting selection of the element; and presenting accessed dynamic web content to the user. The system and method are independent of a web browser or a personal computer.

17 Claims, 11 Drawing Sheets

SYSTEM AND METHOD OF ACCESSING DYNAMIC WEB CONTENT FROM A MULTIFUNCTION PRINTER USING STANDARD PROTOCOLS

FIELD OF THE INVENTION

Embodiments of the invention relate generally to printing systems and methods. More specifically, embodiments of the invention relate to printing systems and methods of accessing dynamic web content.

BACKGROUND OF THE INVENTION

In recent years, multifunction devices (MFDs) have come into widespread use in business and home settings. Such devices provide a broader range of functionality than that provided by traditional single-function devices, such as dedicated printers, scanners, copiers, and facsimile machines. Certain existing MFDs utilize web browsers and applications on personal computers (PCs) in order to access information from the World Wide Web.

SUMMARY OF THE INVENTION

The following summary sets forth certain example embodiments of the invention described in greater detail below. It does not set forth all such embodiments and should in no way be construed as limiting of the invention.

In an embodiment of the invention, a method of accessing dynamic web content from a peripheral comprises the acts of providing a graphical user interface (GUI) on the peripheral, the GUI including a plurality of elements selectable by a user; associating at least one of the elements with a script configured to access dynamic web content when executed; detecting selection of the element; and presenting accessed dynamic web content to the user. The acts of providing the GUI, associating the element, detecting the selection, and presenting the accessed dynamic web content are independent of a web browser or a personal computer.

In another embodiment, a peripheral comprises an interface provision module configured to provide a GUI on the peripheral, the GUI including a plurality of elements selectable by a user; an association module configured to associate at least one of the elements with a script configured to access dynamic web content when executed; a detection module configured to detect selection of the element; and a presentation module configured to present accessed dynamic web content to the user. The interface provision module, association module, detection module, and presentation module are independent of a web browser or a personal computer.

DETAILED DESCRIPTION OF THE INVENTION

Figure 1:
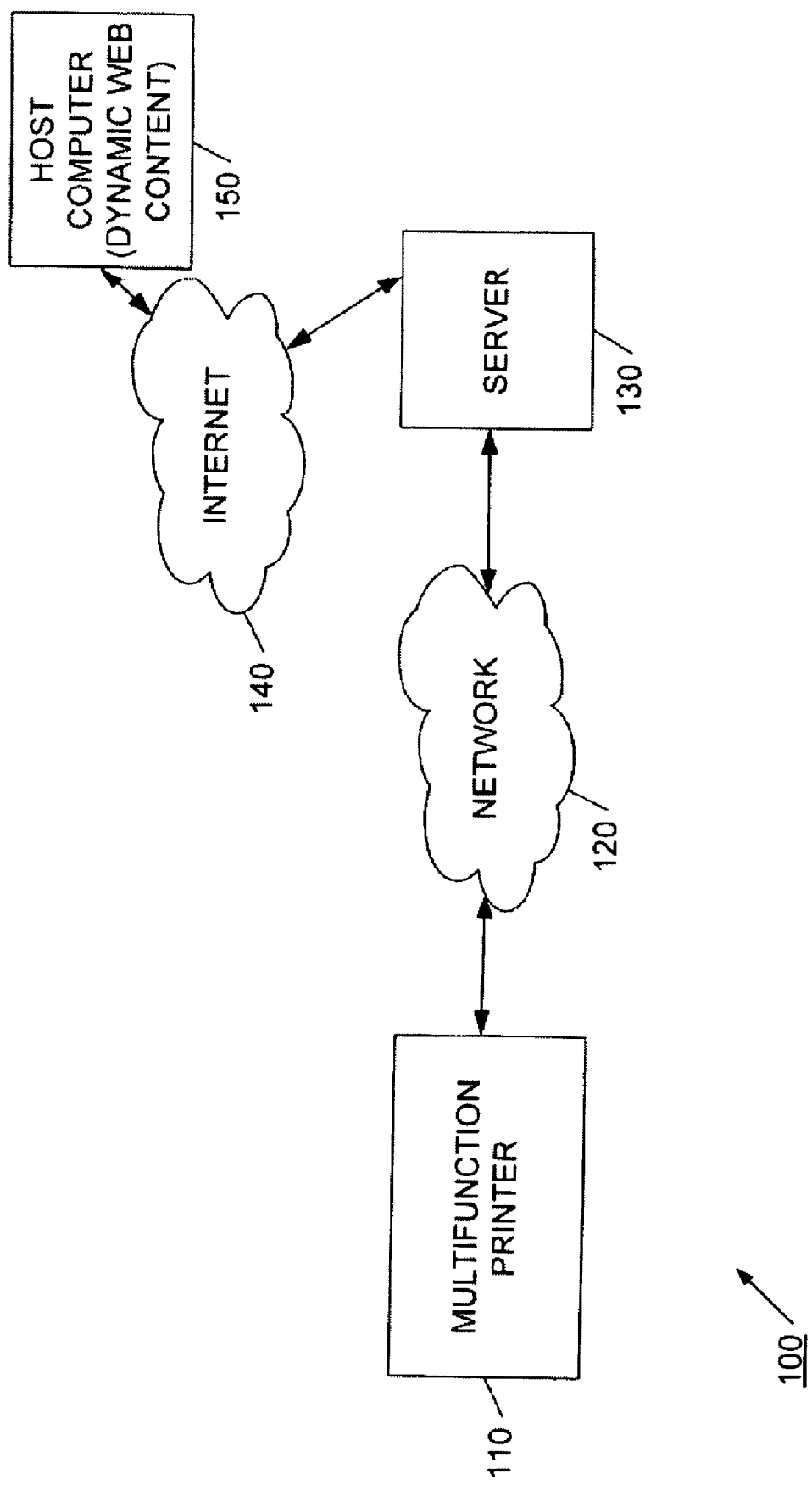
FIG. 1 shows a system for accessing dynamic web content according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. The order of limitations specified in any method claims does not imply that the steps or acts set forth therein must be performed in that order, unless an order is explicitly identified in the specification as essential. In addition, it should be noted that a plurality of hardware and software based devices, as well as a plurality of different structural components, may be utilized to implement the invention.

Embodiments of the invention relate to a printing system and method for accessing dynamic web content from a multifunction device. A GUI of the MFD is configured to include a selectable element, such as an icon. When the user selects the element, one or more executable modules are launched to access dynamic web content, such as, for example, content hosted by a remote web server, and to present that content to the user at the MFD. In an implementation, an intermediate server accesses the content on behalf of the MFD and transparently to the user.

It is to be appreciated that embodiments of the invention do not require a web browser or application on a personal computer to access the dynamic web content. As such, embodiments of the present invention use the foregoing processes and systems to display content on a MFD via a browserless interface. The term browserless interface is used herein to refer to a user interface, and sometimes more particularly to an interface of a MFD, that displays web content without the use of a browser application such as Internet Explorer, Netscape Navigator, Mosaic, Opera, Mozilla, Firefox or Safari to name a few. Accordingly, embodiments herein achieve significant cost savings to manufacturers and consumers, while expanding the scope of useful functions an MFD can support. Moreover, embodiments can be implemented at a kiosk in a mall, airport, or other location to provide benefits to users.

Additionally, the term "PC" is used generically herein to denote, for example, desktop computers, laptops, servers, and other computers that can be suitably configured to operate within the contexts broadly set forth herein. Further, embodiments of the invention can be applied to printers, copiers, scanners, facsimile devices, and combination or multifunction printers and multifunction devices that perform some or all these functions. These peripherals are hereinafter collectively referred to as "printer" or "printer system."

FIG. 1 shows a system 100 for accessing dynamic web content according to an embodiment of the invention. The system 100 includes an MFD 110, a server 130, and a host computer 150. The MFD 110 communicates with the server 130 over a network 120, such as an intranet. The server 130 communicates with the host computer 150 over the Internet 140.

The host computer 150 hosts dynamic web content, such as, for example, online news feeds, blogs, and advertisements. The host computer 150 can provide content using, for example, the RSS (Really Simple Syndication, Rich Site Summary, or RDF Site Summary) protocol or other suitable protocols, such as the Atom protocol that, like RSS, can indicate changes in content.

In an embodiment, the server 130 runs a routing application, such as Lexmark Document Distributor offered by Lexmark International, Inc. (Lexington, Ky.). The server 130 includes a scripting engine that can execute various actions based on content of a script written in a scripting language. A script can be compiled and executed at the server 130. In an example embodiment, a script when executed accesses a configuration file containing a list of RSS files that each contain an RSS header pointing to the location where web content is stored; extracts and parses the list of RSS files; and presents information (e.g., a list of the content or the content itself) to the MFP 110.

Figure 2:
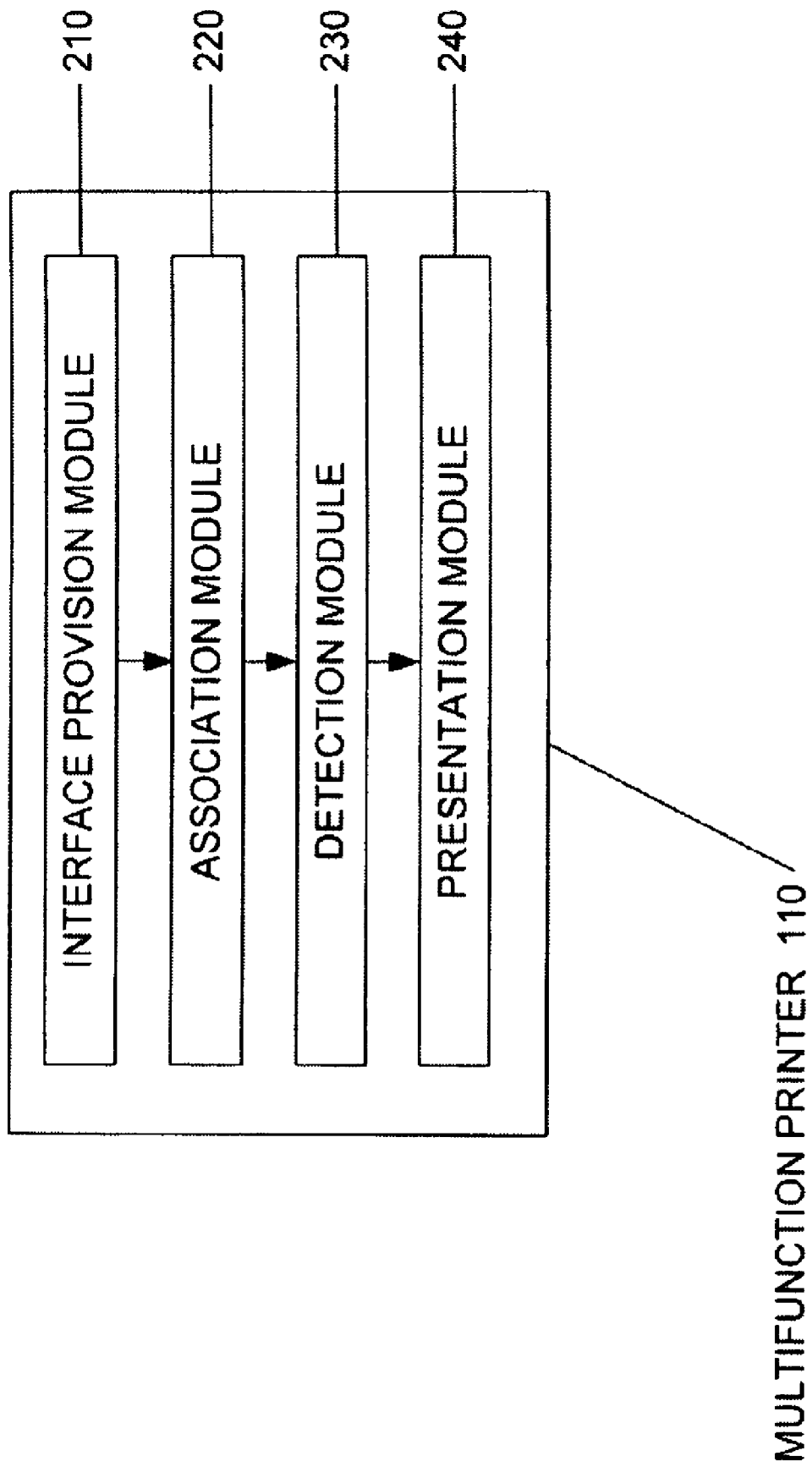
FIG. 2 shows a multifunction printer according to an embodiment of the invention.

FIG. 2 shows an embodiment of the MFD 110 of FIG. 1. The MFD 110 includes an interface provision module 210, an association module 220, a detection module 230, and a presentation module 240. The modules of the MFD 110 can be implemented in various combinations of hardware, software, and/or firmware. The MFD 110 can include a touch screen and/or other suitable input/output device(s), such as a keypad and/or an LCD display (not shown).

The interface provision module 210 provides a GUI on the peripheral. The GUI includes various elements selectable by a user, such as icons or buttons.

The association module 220 associates one or more of the elements with a script configured to access dynamic web content when executed. The term "script" is used generally herein to include any kind of compiled or non-compiled routine having at least one instruction or act to be carried out. In an example implementation, the script when executed calls an action module. Additional information about the operation of action modules is available in the published U.S. Patent Application No. US 2002/0111984 A1, which is hereby incorporated by reference. In some implementations, the association module 220 associates an element of the GUI with a profile that points to a script stored on or accessible to an external server, such as the server 130 of FIG. 1. The server 130 executes the script, contacting the host computer 150 to access dynamic web content.

The detection module 230 detects selection of an element by a user. For instance, the detection module 230 detects when a user has selected the element represented by an icon or button.

The presentation module 240 presents accessed dynamic web content to the user. The content can be displayed on the printer GUI or otherwise presented to the user via suitable output means. In example implementations, the presentation module 240 gives a user an option to review, print, e-mail, or archive the accessed dynamic web content. In an exemplary embodiment, the scripting language of a remote scripting engine defines an API (application programmatic interface) between the scripting engine and the presentation module 240. In order to be displayed on the printer GUI, the accessed dynamic web content may need to be processed (e.g., reformatted) consistent with the framework of the scripting language. Additional information about the processing of accessed dynamic web content is available in U.S. patent application Ser. No. 7,251,780, which is hereby incorporated by reference.

In an embodiment, the presentation module 240 provides a selection interface. Using the provided selection interface, a user can select one or more sources of dynamic web content from among various sources of content. The selection interface can present, for example, a list of sources.

FIGS. 3 to 10 show various example printer interfaces that provide functionality in accordance with embodiments of the invention. It is to be appreciated that the specific look and feel of the interfaces, as well as the sample web content depicted therein, are not limiting of the invention.

Figure 3:
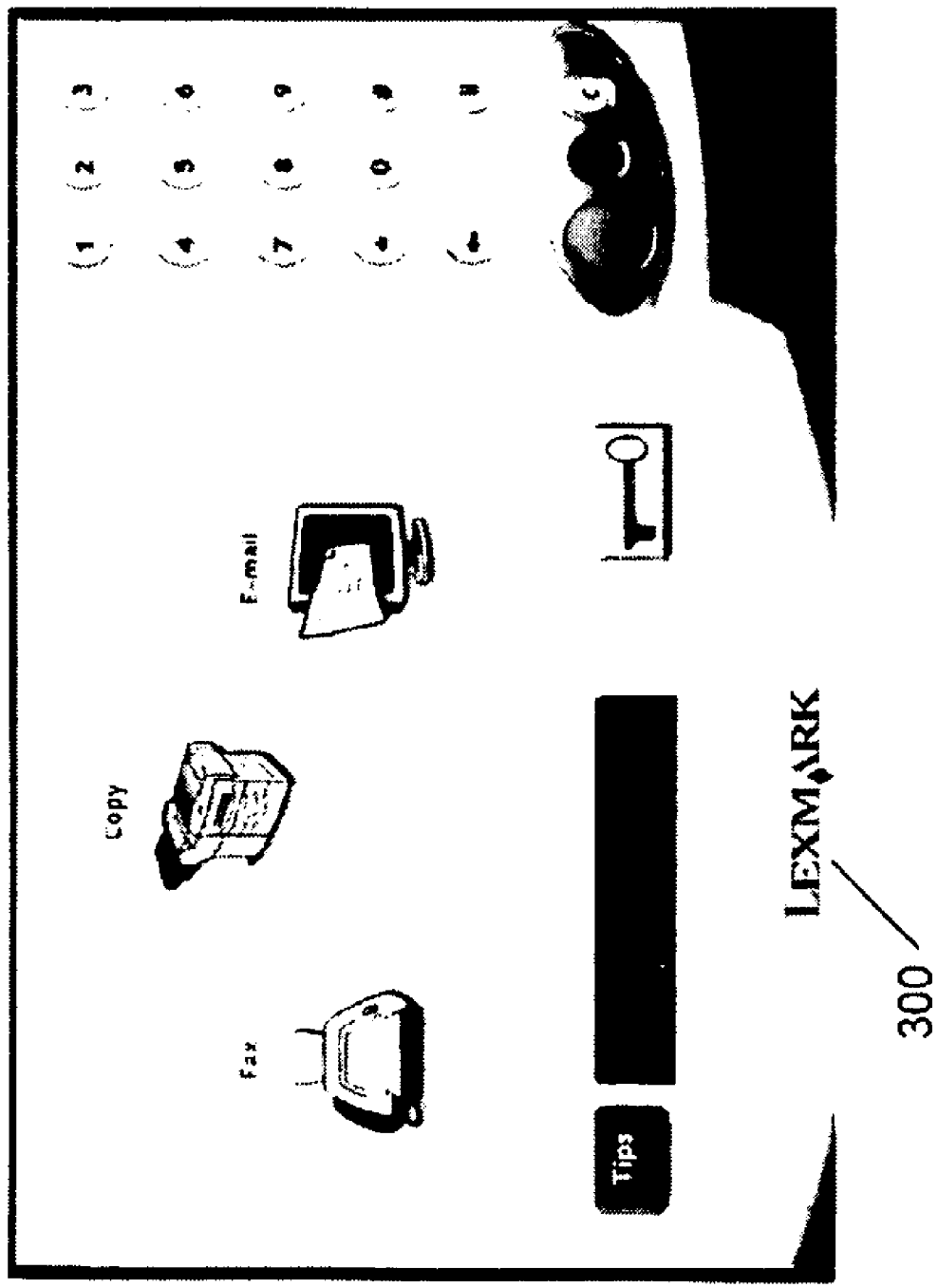
FIG. 3 shows a printer interface according to an embodiment of the invention.

Specifically, FIG. 3 shows a printer interface 300 that can be modified in accordance with the invention. The interface 300 includes a configurable touch screen interface with Fax, Copy, and E-mail icons and an adjacent keypad. The configurable touch screen interface enables an administrator to redesign and update the touch screen. One example feature provided through the touch screen is a profile. Among other things, a profile can be associated with a script to be executed, such as a script associated with the server 130 of FIG. 1. Profiles can be sent from a network-accessible device (such as the server 130) to an MFD. The MFD receives the profiles and adds the profiles to its list of profiles.

Figure 4:
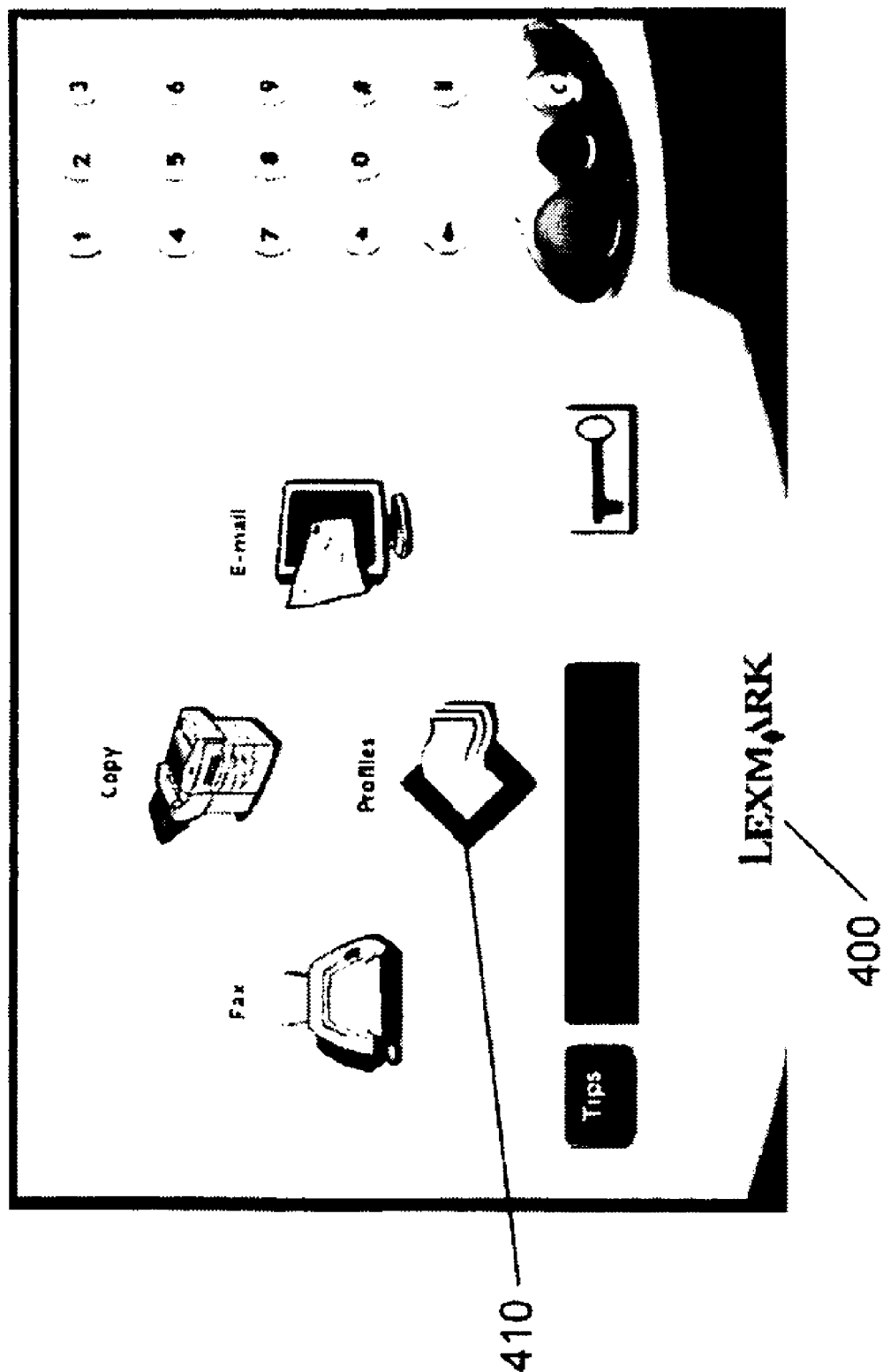
FIG. 4 shows a printer interface according to an embodiment of the invention.

FIG. 4 shows a printer interface 400 according to an embodiment of the invention. The interface 400 includes a profiles icon 410. Such a profiles icon 410 can be configurably placed on the touch screen interface by a systems administrator, another user, or an automated process, or can be preprogrammed into the system. The profiles icon 410, when selected by a user, can present a list of profiles.

Figure 5:
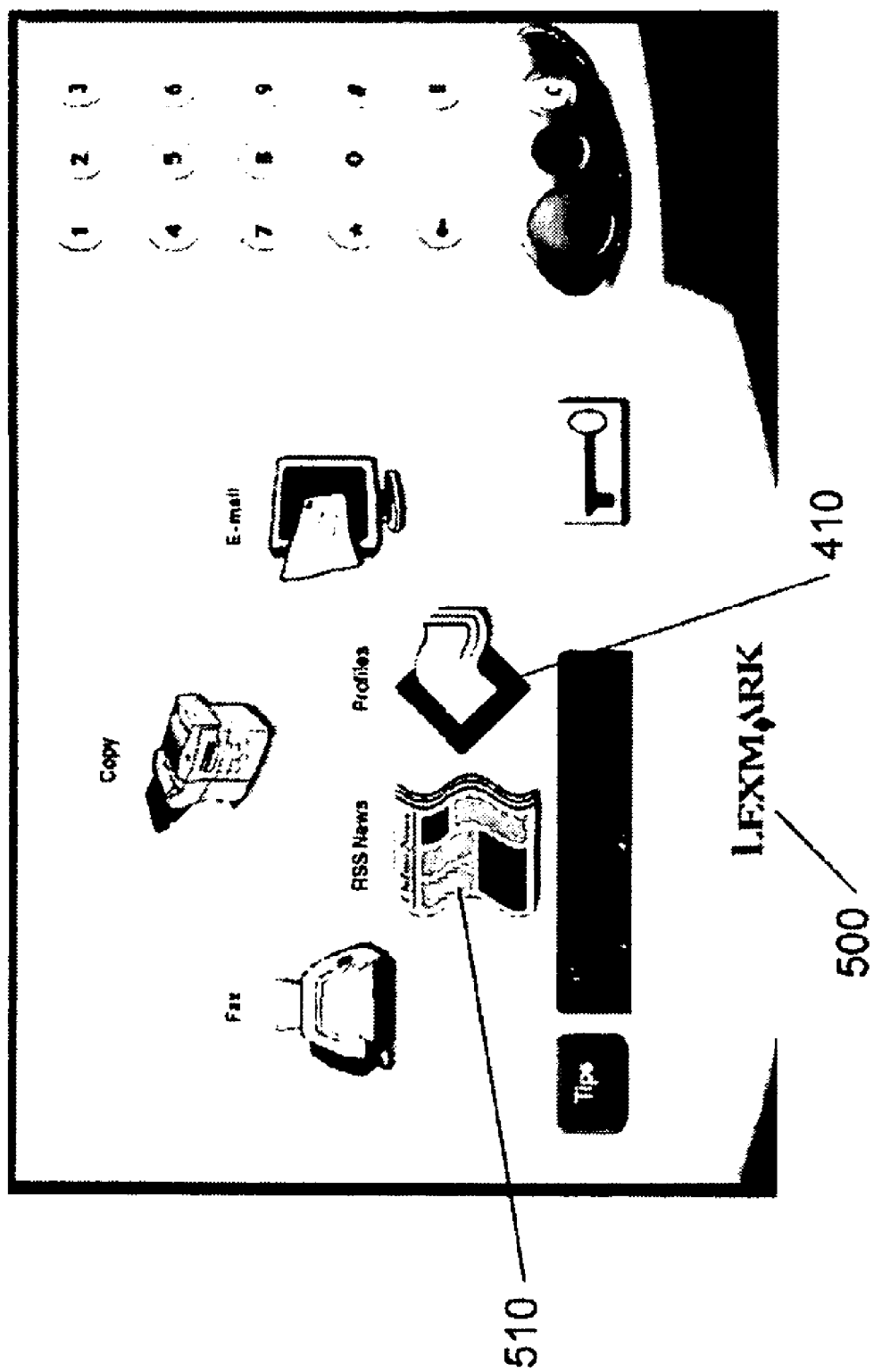
FIG. 5 shows a printer interface according to an embodiment of the invention.

FIG. 5 shows a printer interface 500 according to an embodiment of the invention. The interface 500 includes the profiles icon 410 and a custom profile icon 510 for online news feeds. When the custom profile icon 510 is selected, the scripting engine of the server 130 is accessed. More particularly, the custom profile icon 510 is associated with a profile that points to a script to be executed by the server 130. The script, which can call a customized action module, provides access to dynamic web content via RSS.

Figure 6:
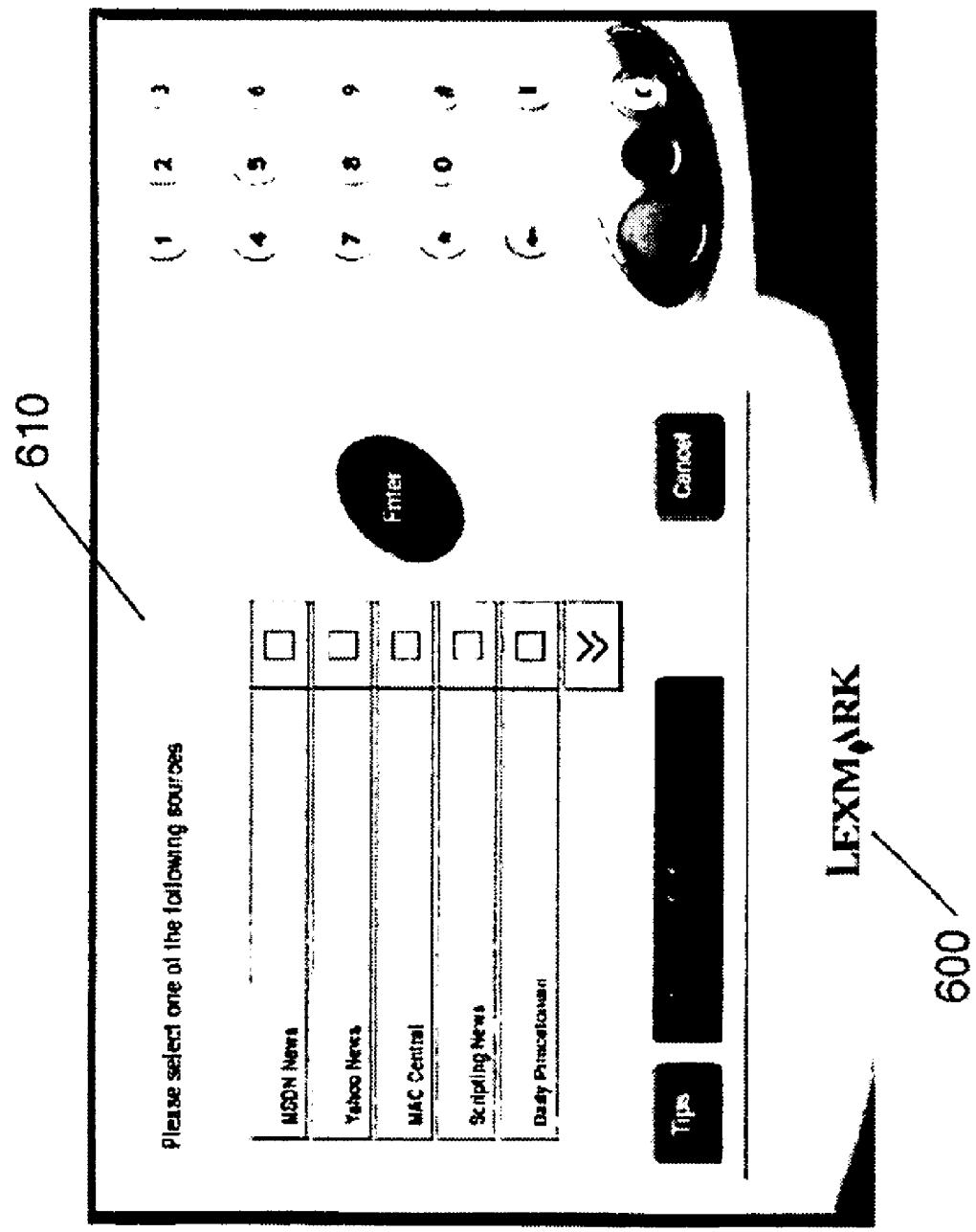
FIG. 6 shows a printer interface according to an embodiment of the invention.

FIG. 6 shows a printer interface 600 according to an embodiment of the invention. The interface 600 shows a listing 610 of configured RSS sources. The content of the list can be dynamic and can be based on, for example, available sources unique to an instance of an MFP application, and/or based on a set of sources available based on credentials of a user or a device.

Figure 7:
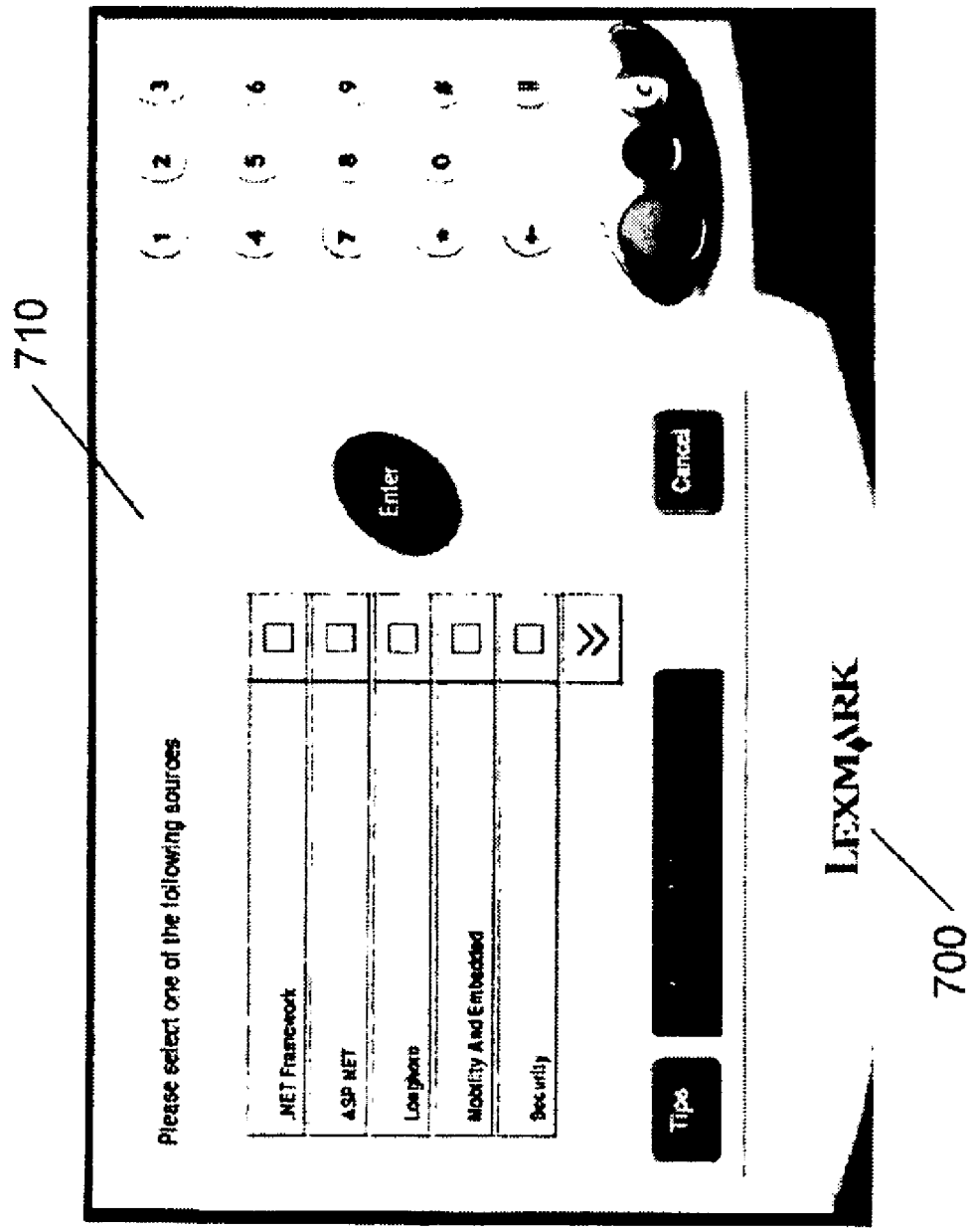
FIG. 7 shows a printer interface according to an embodiment of the invention.

FIG. 7 shows a printer interface 700 according to an embodiment of the invention. The interface 700 shows a dynamic listing of sources retrieved from an Internet-based syndication server. Each time the server is accessed, the retrieved content potentially can be different. Moreover, in an embodiment, the scripting engine of the server 130 is programmable. As such, the content delivered to the MFD can be generated automatically without a need for input from a user of the MFD.

Figure 8:
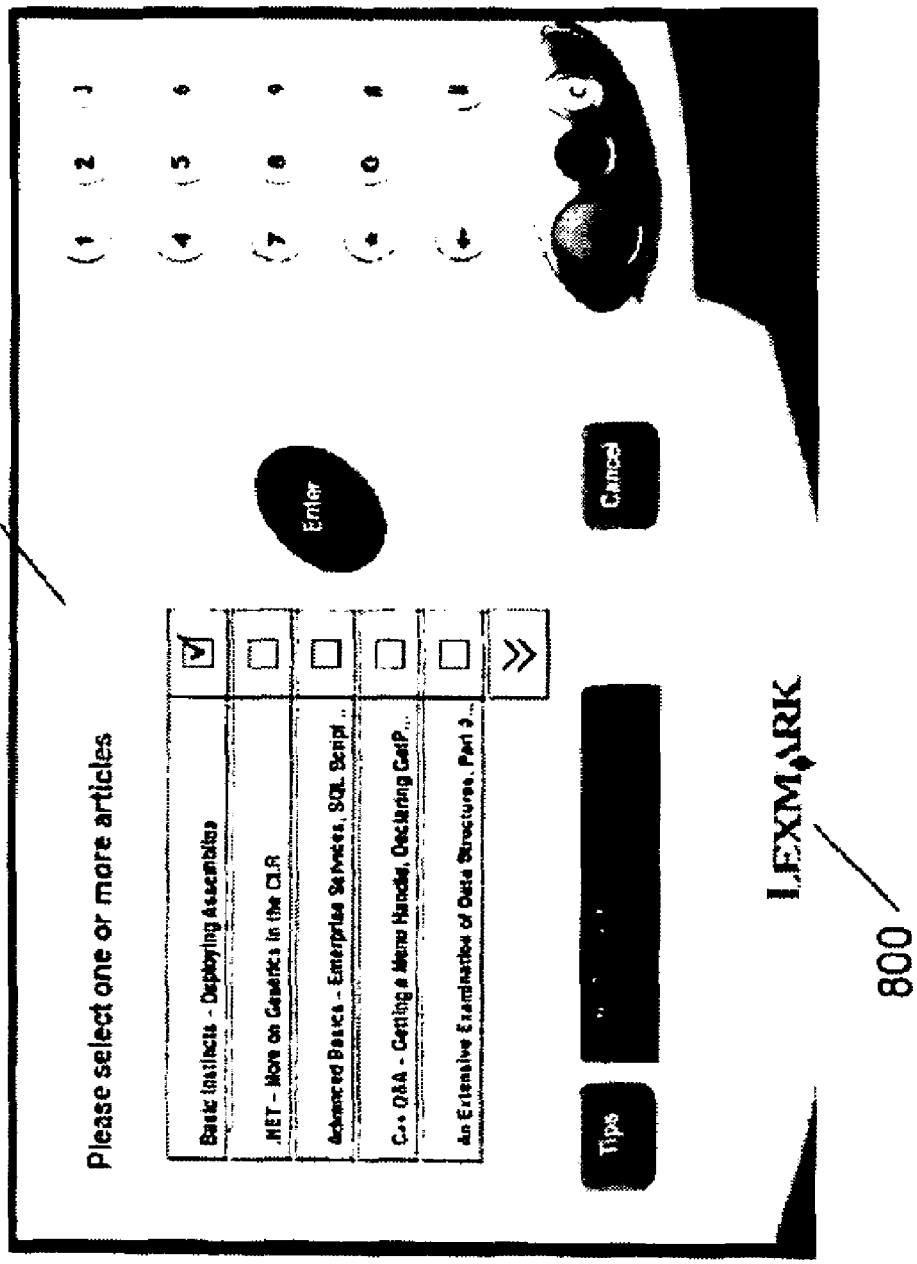
FIG. 8 shows a printer interface according to an embodiment of the invention.

FIG. 8 shows a printer interface 800 according to an embodiment of the invention. The interface 800 shows a dynamically created listing 810 of published content. The content can dynamically change based on what is retrieved in each instance.

Figure 9:
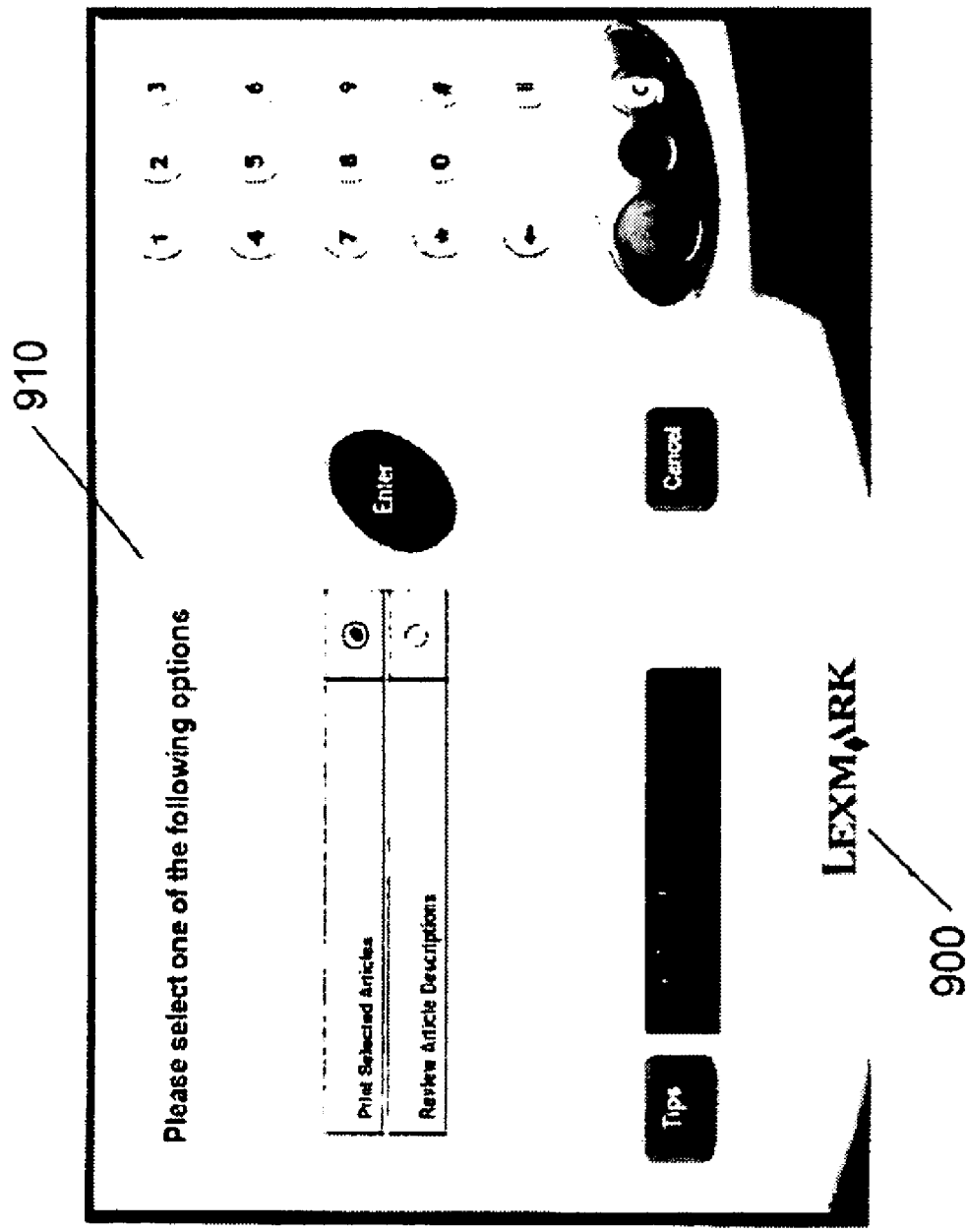
FIG. 9 shows a printer interface according to an embodiment of the invention.

FIG. 9 shows a printer interface 900 according to an embodiment of the invention. The interface 900 shows a selection screen 910 by which a user can optionally preview or print accessed web content. Because the scripting engine of the server 130 is programmable, the delivered content can be generated automatically without a need for input from a user. Moreover, additional or alternative options can be made available, such as to e-mail or archive the content.

Figure 10:
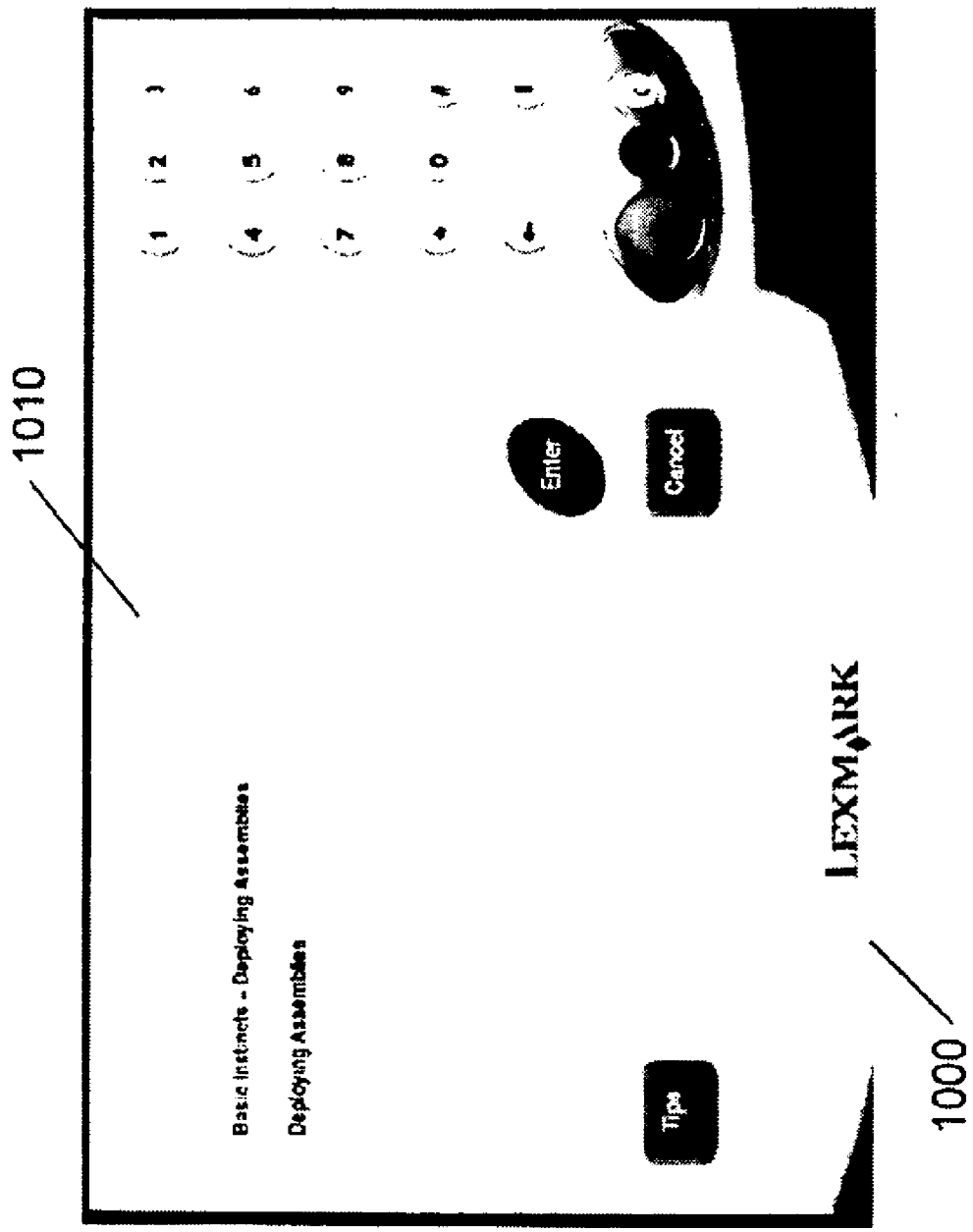
FIG. 10 shows a printer interface according to an embodiment of the invention.

FIG. 10 shows a printer interface 1000 according to an embodiment of the invention. The interface 1000 shows previewed accessed content 1010 before it is printed. Such content is dynamic and is retrieved for each selected RSS article.

Figure 11:
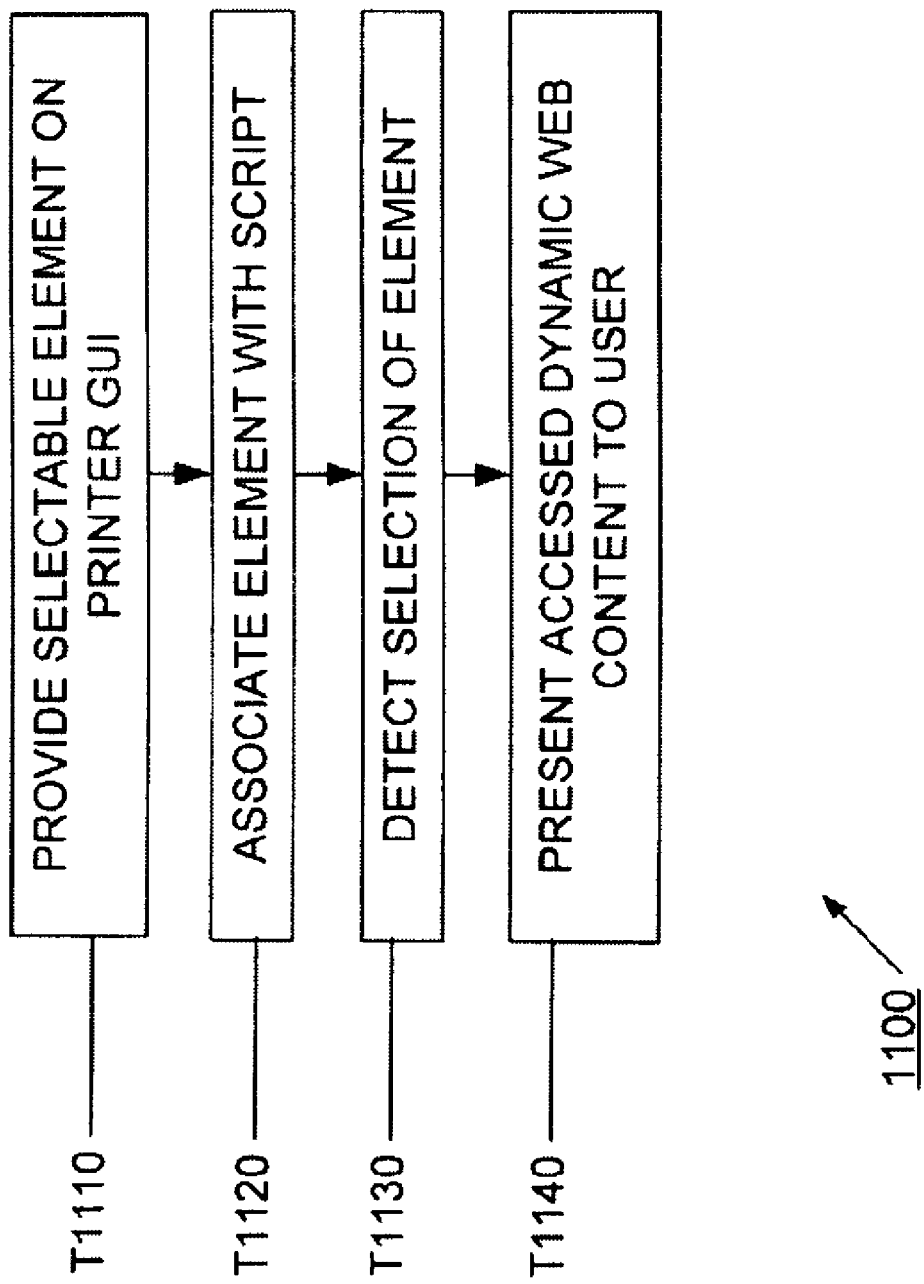
FIG. 11 shows a process for accessing dynamic web content according to an embodiment of the invention.

FIG. 11 shows a process 1100 for accessing dynamic web content according to an embodiment of the invention. The process 1100 can be employed, for instance, in conjunction with various embodiments presented above. Task T1110 provides a selectable element on a GUI of a printer. Task T1120 associates the element with a script. Task T1130 detects selection of the element by a user. Task T1140 presents accessed dynamic web content to the user.

Alternative embodiments of the invention can be realized. For instance, an MFD can be provided with a web browser to access content unrelated to content accessed as specifically described herein. Accordingly, such a printer can economically provide a wider array of functions to a user.

As should also be apparent to one of ordinary skill in the art, the systems shown in the figures are models of what actual systems can be like. As noted, many of the modules and logical structures described are capable of being implemented in software executed by a microprocessor or a similar device or of being implemented in hardware using a variety of components including, for example, ASICs. Terms like "processor" may include or refer to both hardware and/or software. Furthermore, throughout the specification capitalized terms are used. Such terms are used to conform to common practices and to help correlate the description with the examples and drawings. However, no specific meaning is implied or should be inferred simply due to the use of capitalization. Thus, the claims should not be limited to the specific examples or terminology or to any specific hardware or software implementation or combination of software or hardware.

Various features and advantages of the invention are set forth in the following claims.

What is claimed:

1. A method of using a peripheral device to retrieve content from a web site and to display said content on said peripheral device, said peripheral device including a browserless interface, said method comprising:
   providing said browserless interface on said peripheral, said browserless interface having at least one selectable element;
   associating a script with said at least one selectable element such that, when said at least one element is selected, said script causes content to be retrieved from said web site and to be displayed on said peripheral via said browserless interface;
   wherein said script resides on a computing device that is remote from said peripheral and a profile stored locally on said peripheral identifies said script and a location of said script;
   wherein said browserless interface is usable to allow a user to navigate said content and request additional information from said web site or another web site;
   and wherein said peripheral is a multifunction device.

2. The method of claim 1, wherein said script resides on a computing device that is remote from said peripheral and in response to a user selection of said at least one element, said script causes an action module to retrieve said content from said web site.

3. The method of claim 1, wherein said content retrieved from said web site is formatted as an extensible markup language file.

4. The method of claim 1, wherein said script resides on a computing device remote from said peripheral and uses an action module to retrieve said content.

5. The method of claim 4, wherein said content is retrieved from a remote web site and stored on said computing device.

6. The method of claim 5, wherein said action module periodically updates said content and stores said updated content on said computing device.

7. The method of claim 6, wherein said action module updates said content at predetermined intervals.

8. The method of claim 1, wherein said browserless interface includes a plurality of selectable elements and two or more of said selectable elements correspond to different sources of content.

9. The method of claim 1, further comprising the step of printing at least a portion of said retrieved content.

10. The method of claim 1, further comprising the step of sending at least a portion of said retrieved content from said peripheral to another device via facsimile or electronic mail.

11. The method of claim 1, wherein said peripheral is part of a kiosk.

12. A peripheral configured to be connected to a network, the peripheral comprising:
   an interface module that provides a browserless interface on said peripheral, said browserless interface including at least one selectable element;
   an association module that associates said at least one selectable element with a script, said script having instructions that, when executed, cause a retrieval of content from a web site; and
   a presentation module that displays said retrieved content via said browserless interface;
   wherein said script resides on a computing device that is remote from said peripheral and a profile stored locally on said peripheral identifies said script and a location of said script;
   wherein said browserless interface is usable to allow a user to navigate said content and request additional information from said web site or another web site;
   and wherein said peripheral is a multifunction device.

13. The peripheral of claim 12, further comprising a detection module that monitors at least a portion of said interface and determines when a selection of said at least one selectable element has occurred.

14. The peripheral of claim 12, further comprising an interface module that communicates with a remote computing device.

15. The peripheral of claim 14, wherein said script when executed, causes said remote computing device to retrieve said content from said web site and to transmit at least a portion of said retrieved content to said peripheral.

16. A system for retrieving content from a remote web site and delivering at least a portion of said content to a user, said system comprising:
   a peripheral device having a browserless interface, said browserless interface including one or more selectable elements, each of said selectable elements being associated with a script; and
   a host computing device in electronic communication with said peripheral device, said host computer configured to retrieve said content from said web site in response to a user selection of at least on of said selectable elements, and to deliver at least a portion of said retrieved content to said peripheral device;

wherein said script resides on the host computing device that is remote from said peripheral device and a profile stored locally on said peripheral device identifies said script and a location of said script;

wherein said browserless interface is usable to allow a user to navigate said content and request additional information from said web site or another web site;

and wherein said peripheral device is a multifunction device.

17. The system of claim 16, wherein said host computing device is additionally configured to process said retrieved content to allow said content to be displayed via said browserless interface.

\* \* \* \* \*